United States Patent
Niezelski et al.

(10) Patent No.: US 9,070,937 B2
(45) Date of Patent: Jun. 30, 2015

(54) FUEL CELL SYSTEMS AND RELATED ARRANGEMENTS FOR LIMITING RELATIVE MOTION BETWEEN FUEL CELLS

(71) Applicant: Ballard Power Systems Inc., Burnaby (CA)

(72) Inventors: David A. Niezelski, Manchester, CT (US); Jeffery G. Lake, Vernon, CT (US); Robert A. Love, Bloomfield, CT (US); Jason Bennett Blydenburgh, Salem, CT (US)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/138,251

(22) Filed: Dec. 23, 2013

(65) Prior Publication Data

US 2014/0113212 A1    Apr. 24, 2014

Related U.S. Application Data

(63) Continuation of application No. 13/138,060, filed as application No. PCT/US2009/001311 on Mar. 2, 2009, now Pat. No. 8,652,702.

(51) Int. Cl.
*H01M 2/20*    (2006.01)
*H01M 8/24*    (2006.01)
(Continued)

(52) U.S. Cl.
CPC .............. *H01M 8/247* (2013.01); *H01M 8/00* (2013.01); *H01M 8/0297* (2013.01);
(Continued)

(58) Field of Classification Search
CPC .......... H01M 8/00; H01M 2008/1095; H01M 8/006; H01M 8/241; H01M 8/2415; H01M 8/247; H01M 8/0276; H01M 8/0297; Y02E 60/50
USPC ......... 429/456, 457, 458, 460, 461, 467, 468, 429/469, 470, 471, 508, 510, 518, 535
See application file for complete search history.

(56) References Cited

U.S. PATENT DOCUMENTS

| 5,484,666 A | 1/1996 | Gibb et al. |
| 6,423,439 B1 | 7/2002 | Barton et al. |

(Continued)

FOREIGN PATENT DOCUMENTS

| JP | 2005-183358 A | 7/2005 |
| JP | 2007-510279 A | 4/2007 |

OTHER PUBLICATIONS

International Search Report, mailed Sep. 1, 2009, for International Application No. PCT/US2009/001311, 2 pages.

*Primary Examiner* — Patrick Ryan
*Assistant Examiner* — Ben Lewis
(74) *Attorney, Agent, or Firm* — Seed IP Law Group PLLC

(57) ABSTRACT

Fuel cell systems (10) and related methods for limiting fuel cell slippage are provided. A stacked plurality of adjacent fuel cells (14) collectively forming a fuel cell stack (12). The fuel cells each include a pair of first and second plates (30, 30', 30''; 32, 32', 32'') at respective opposite ends thereof. A first fuel cell has a first plate (30, 30', 30'') in engagement with a second plate (32, 32', 32'') of a second fuel cell adjacent to the first fuel cell. A slip mitigation arrangement (50, 50', 50'') between at least one of the pairs of the first and second fuel cells comprises first and second seats (62, 62', 62''; 64, 64', 64'') recessed in the engagement surfaces of the first and second conductive plates respectively, and a key member (60, 60', 60'') having opposite ends seated in the first and the second recessed seats such that relative movement between the first and the second fuel cells is limited.

3 Claims, 3 Drawing Sheets

(51) Int. Cl.
*H01M 8/00* (2006.01)
*H01M 8/02* (2006.01)
*H01M 8/10* (2006.01)

(52) U.S. Cl.
CPC ........... *H01M 8/0276* (2013.01); *H01M 8/241* (2013.01); *H01M 8/2415* (2013.01); *H01M 8/006* (2013.01); *H01M 2008/1095* (2013.01); *Y02E 60/50* (2013.01)

(56) References Cited

U.S. PATENT DOCUMENTS

| | | | |
|---|---|---|---|
| 6,620,540 | B2 | 9/2003 | Sugita et al. |
| 7,297,428 | B2 | 11/2007 | Saulsbury et al. |
| 7,560,187 | B2 | 7/2009 | Inagaki |
| 2008/0026281 | A1* | 1/2008 | Hayashi et al. ............ 429/36 |

* cited by examiner

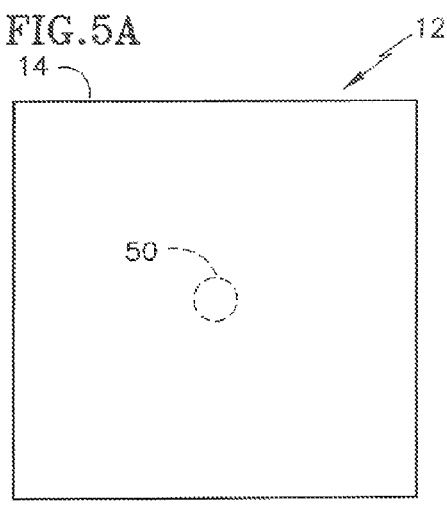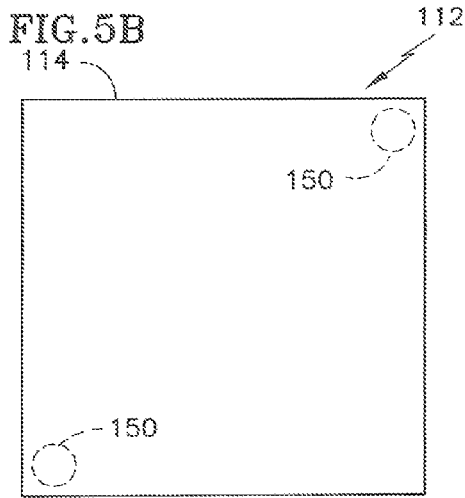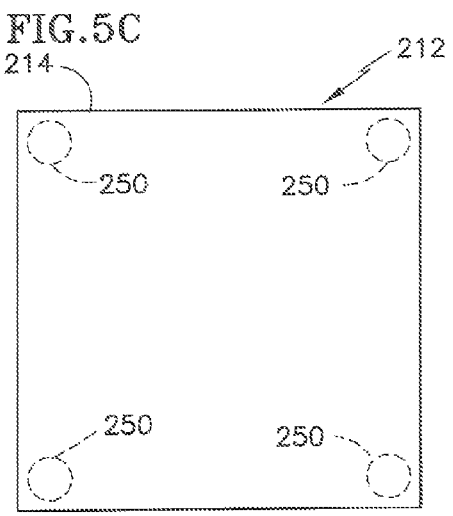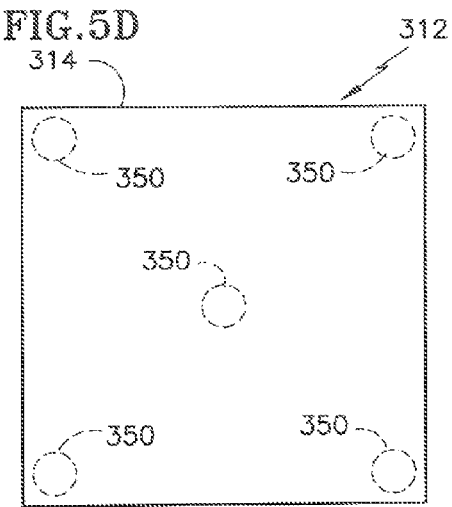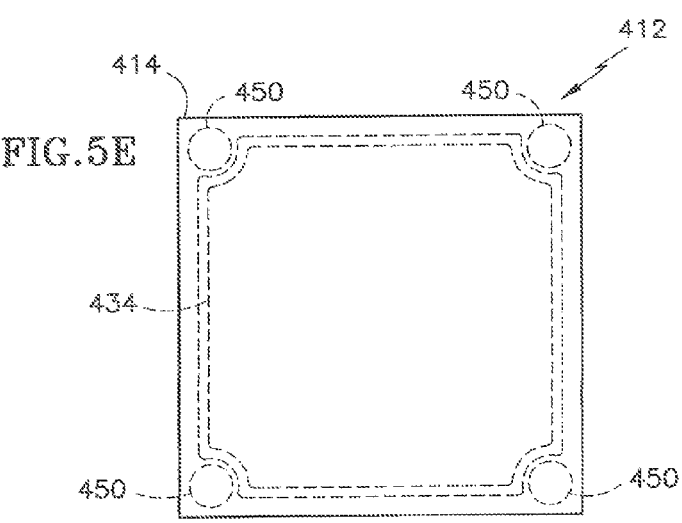

FUEL CELL SYSTEMS AND RELATED ARRANGEMENTS FOR LIMITING RELATIVE MOTION BETWEEN FUEL CELLS

CROSS-REFERENCE TO RELATED APPLICATIONS

This application is a continuation of U.S. patent application Ser. No. 13/138,060 filed Jun. 29, 2011, now allowed, which is in turn a 35 USC 371 National Phase application of international PCT Application Number PCT/US2009/001311 filed Mar. 2, 2009.

BACKGROUND

1. Technical Field

The disclosure relates generally to fuel cells, and more particularly to arrangements, including methods, for limiting relative motion between fuel cells in a fuel cell stack.

2. Description of the Related Art

Fuel cells, such as Proton Exchange Membrane (PEM) fuel cells, oftentimes are arranged in assemblies known as fuel cell stacks. In such a fuel cell stack, the fuel cells are oriented one on lop of, or next to, another, with the fuel cells being sandwiched between pressure plates. The pressure plates act in compression to longitudinally prevent the fuel cells from separating. Various arrangements exist for facilitating assembly and/or maintaining alignment or registration of the cells in a stack, as exemplified by alignment plugs for facilitating assembly in U.S. Pat. No. 6,423,439; registration inserts and non-identically shaped registration apertures in U.S. Pat. No. 7,297,428; and insulated rods and holes in U.S. Pat. No. 6,620,540.

While the foregoing arrangements are intended to facilitate assembly and/or maintain registration of feel cells and fuel cell components in a feel cell stack, further improvement with respect to structure, durability and operability is sought, particularly for fuel cell slacks to be housed and operated in enclosed, human-occupied vehicles where maintaining sealed integrity of the stack under possible operating conditions of extreme vibration and shear loading is of particular importance. One aspect of concern is that the fuel cell stack be protected against slippage, and thus leakage and/or damage to components, which may occur as the result of large shear loads.

BRIEF SUMMARY

Fuel cell systems and related arrangements, including methods, for limiting relative motion between fuel cells in a feel cell stack are provided. An exemplary embodiment of a fuel call system comprises a stacked plurality of adjacent fuel cells collectively forming a fuel cell stack, the fuel cells each including a pair of first and second plates, typically conductive, at respective opposite ends thereof and an electrolyte, for example a proton exchange membrane (REM), there between, a first said fuel cell having a first said plate in engagement with a second said plate of a second fuel cell adjacent to said first fuel cell at respective engagement surfaces thereof; and a slip mitigation arrangement between at least said first and said second fuel cells comprises a first seat recessed in said engagement surface of said first plate, a second seat recessed in said engagement surface of said second plate, and a key member having opposite ends seated in said first and said second recessed seats such that relative movement between said first and said second fuel cells is reduced or dampened.

In another example embodiment of a fuel cell system, the fuel cells each include an interfacial seal in sealing engagement with said first and said second plates, the plates of the fuel cells are formed of a material having a first relative hardness or stiffness, the key member of the slip mitigation arrangement is formed of a material having a second hardness or stiffness typically relatively less than that of the material of the plates, and the interfacial seals are formed of a material having a third hardness or stiffness relatively less than that of the key member. Stated another way, the material of the key member of the slip mitigation arrangement has a relative hardness equal or typically less than that of the material of the plates, but greater than that of the interfacial seals.

In a further example embodiment of a fuel cell system, the first and the second recessed seats of the slip mitigation arrangement have respective cross-sectional geometries, the key member has a cross-sectional geometry similar to but slightly smaller than the cross-sectional geometries of the recessed seats and a length greater than the combined depths of the first and second seats such that the key member is longitudinally compressed to expand transversely into said firm engagement with the sides of said first and said second seats when the fuel cell stack is fully assembled.

In yet a further example embodiment of a fuel cell system, the key member of a slip mitigation arrangement is annular and is mounted, prior to stack assembly, on a mounting stub in one of the first and second recessed seats.

In a still further example embodiment of a fuel cell system, the first and second recessed seats of the slip mitigation arrangement are circular in cross-section and the key member is a disk.

An example method is disclosed for minimizing slip due to shear loading between adjacent fuel cells in a stack of plural fuel cells. The fuel cells each including a pair of first and second plates at respective opposite ends thereof and an electrolyte there between, a first said feel cell has a first said plate for engagement with a second said plate of a second fuel cell adjacent to said first fuel cell at respective engagement surfaces thereof, and the method comprises providing a first seat recessed in the engagement surface of said first plate; providing a second seat recessed in the engagement surface of said second plats; the first and the second seats having respective cross-sectional geometries; providing a key member disposed in one of the first and the second seats poor to stack assembly, the key member having a cross-sectional geometry similar to but slightly smaller than the cross-sectional geometries of the first and the second seats and having a length slightly greater than the combined depths of the first and the second seats; and assembling and longitudinally compressing the fuel cells in the stack to bring the fuel cells into engagement with one another and correspondingly longitudinally compress the key member and cause transverse expansion thereof into firm engagement with the sides of the first and second seats to thereby reduce any movement between the fuel cells.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIGS. 3A and 3B are partial sectional views similar to those of FIGS. 2A and 2B, illustrating a further embodiment of a slip mitigation arrangement.

FIGS. 5A, 5B, 5C, 5D, and 5E are simplified, schematic, plan form, or fop, views of various numbers and locations of slip mitigation arrangements on a fuel cell in a stack.

DETAILED DESCRIPTION

Fuel cell systems and related methods for limiting feel cell slippage are provided, several exemplary embodiments of which will be described in detail. In this regard, example embodiments involve the use of Proton Exchange Membrane (PEM) fuel cells arranged in fuel cell stacks that incorporate slip mitigation arrangements. The slip mitigation arrangements involve key members disposed in respective key seats in pairs of adjacent fuel cells to limit the possibility of fuel cells of a fuel cell stack being able to move, or slide, relative to each other.

Figure 1:
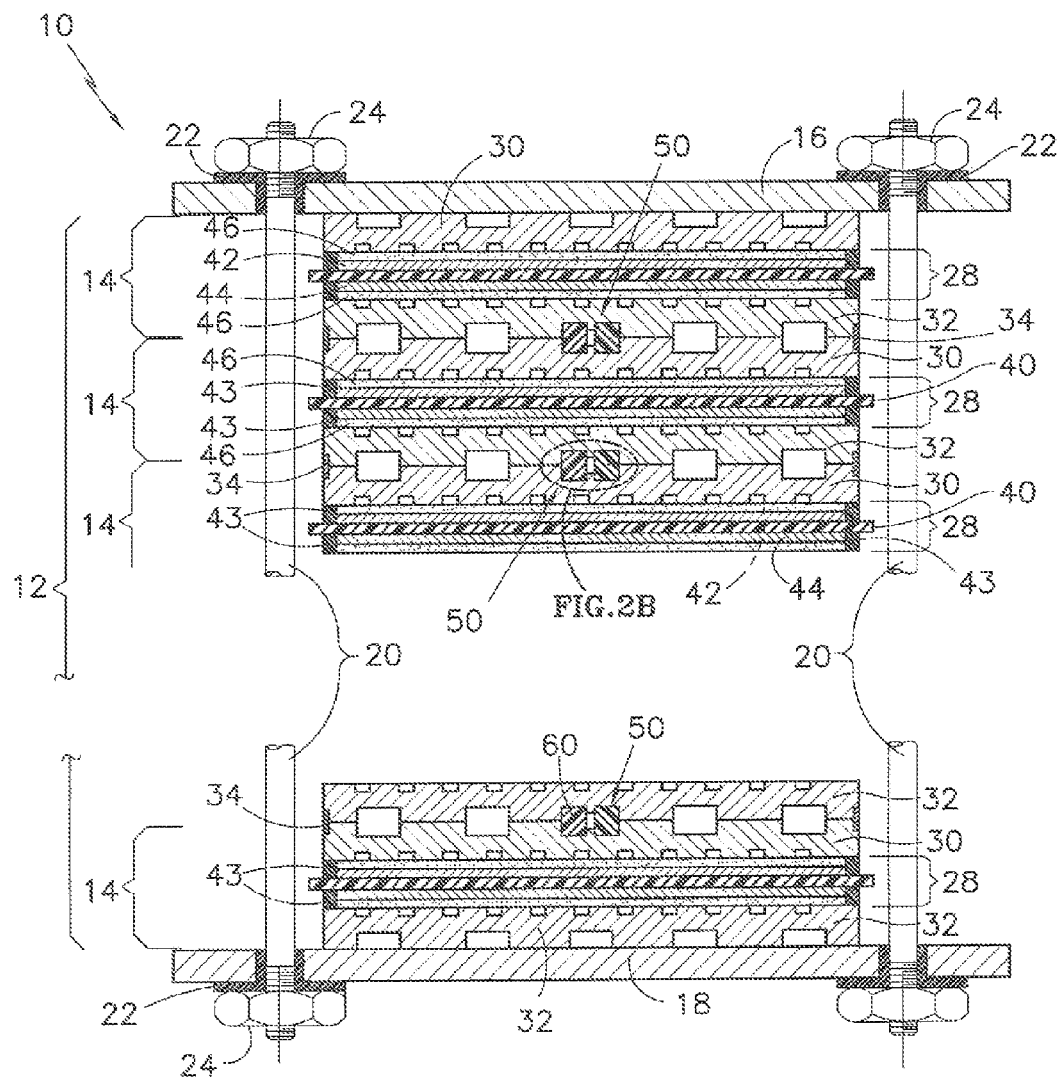
FIG. 1 is a schematic diagram depleting an exemplary embodiment of a fuel cell system having a slip mitigation arrangement.

FIG. 1 is a schematic diagram depleting an exemplary embodiment of a fuel cell system 10. As shown in FIG. 1 system 10 incorporates a fuel cell stack 12 comprising multiple fuel cells 14 arranged, or "stacked", on or next to each other in sandwich fashion. Pressure plates 16 and 18 are located at opposing ends of the stack 12. A group of tie rods 20 extend in tension between pressure plates 16 and 18 and serve, with insulated bushings 22 and fastening nuts 24, to apply a longitudinal compressive force to stack 12 to maintain the fuel cells 14 in close mutual engagement in the longitudinal direction. Each fuel cell 14 typically includes a membrane electrode assembly (MEA) 28, and anode and cathode plates 30 and 32, respectively, adjacent the opposite surfaces of the MEA 28. Interracial seals 34 are located in mutual sealing contact with adjacent anode and cathode plates 30 and 32 in adjacent fuel cells 14 in the stack 12, at or near the outer perimeters of those plates, to provide a gas and liquid seal within the stack at the interface between the adjacent fuel cells 14. The interfacial seals 34 may conveniently be edge seals if located at the outer perimeters of the plates, as depicted in FIG. 1, but may alternatively be located somewhat inboard of those perimeters so long as they continue to provide the requisite gas and liquid seals.

The membrane electrode assembly 28 includes an electrolyte in the form of a central proton exchange membrane 40, anode and cathode catalyst layers 42 and 44, respectively, on opposite sides of the membrane 40, and may include gas diffusion layers 46 adjacent the outward surfaces of the catalyst layers. Gaskets 43, typically of thin plastic film, are placed on or near the outer periphery of the anode and cathode catalyst layers 42 and 44 with the membrane 40 sandwiched there between to prevent outward leakage of reactant gasses.

The anode plate 30 and cathode plate 32 are variously Known as bipolar plates, separator plates, field flow plates, or similar. Plates 30 and 32 serve to distribute reactants (typically hydrogen and an oxidant, such as air) to the MEA 28 for electrochemical reaction, may also distribute coolant and/or remove product water, and serve as electrically-conductive members for providing electrical contact and continuity between adjacent fuel cells 14. The plates 30 and 32 will be referred to collectively herein as bipolar plates, or separately as anode and cathode bipolar plates, respectively, or simply as plates 30 and 32. The bipolar plates 30 and 32 are typically formed of an electrically-conductive material such as graphite, graphite composite, or metal, and are relatively hard, rigid, and durable. For the purpose of the discussion herein, the term "hardness" will be used to describe and relate an important property of the materials of several different elements appearing in the stack 12, particularly at the interface region between adjacent fuel cells 14. The term "hardness", in the elastic range, represents a small temporary change in shape for a given force, and is known as "stiffness" in the case of a given object, or a high elastic modulus in the case of a material. "Durometer" is one of several measures of the hardness of materials, depending in part on the general type of material.

In contrast with the material of the bipolar plates 30 and 32, the material of the interfacial seals 34 is relatively less hard, or more resilient softer and less stiff, typically being plastic or rubber and having a significantly lower modulus than that of the bipolar plates. The seals 34 are required to provide a seal or barrier to retain the various reactants and reaction products within the adjacent fuel cells 14, and prevent leakage externally, as to the local environment. If the fuel cell system 10 were subjected to sharp and/or large forces transverse (or lateral) to the longitudinal extent of the stack 12, the possibility of leakage at the seals 34 due to slippage between the fuel cells 14 might occur were it not for the slip mitigation arrangement 50 to be disclosed hereinafter in detail.

Figure 2A:
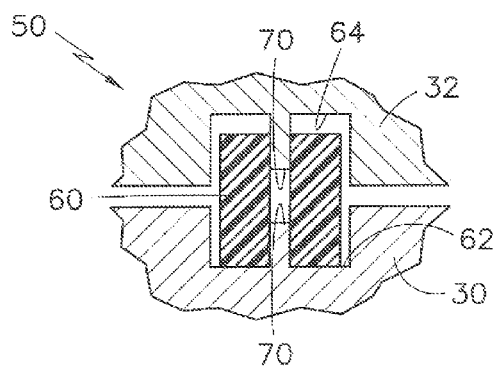
FIGS. 2A and 2B are partial sectional views of a portion of the slip mitigation arrangement of FIG. 1, with FIG. 2A depicting the arrangement prior to complete assembly of the fuel cell system and FIG. 2B being an enlarged depletion of the arrangement in the assembled system as represented by the broken line 2A in FIG. 1.

Accordingly, a slip mitigation arrangement 50 is provided in association with one or more, or typically each, adjacent pair of fuel cells 14 in stack 12 of the fuel cell system 10. The slip mitigation arrangement 50 is seen generally in FIG. 1 but is seen in greater detail and/or in alternate embodiments in FIGS. 2A, 2B, 3A, 3B, and 4. Referring first to FIGS. 2A and 2E, the slip mitigation arrangement 50 of FIG. 1 is shown in FIG. 2A prior to final assembly of the stack 12, and in FIG. 2B as an exploded view of the dotted segment 28 of FIG. 1 following assembly and compression of the stack 12 by the pressure plates 16 and 13 via the rods 20. The slip mitigation assembly 50 composes a key member 60 seated partly in a key seat recess 62 formed in the outer surface of anode bipolar plate 30 of one fuel cell, and partly in a similar key seat recess 64 in the outer surface of cathode bipolar plate 32 of the adjacent facing fuel cell. The key seat recesses may be formed by counterboring or other suitable form of machining. The key member 80 is formed of a material which is rigid enough to maintain, the adjacent fuel cells 14 in registry or alignment under significant transverse, or shear, loads, yet is flexible enough to avoid damage to the anode and cathode bipolar plates 30 and 32. The key member has a hardness greater than that of the interfacial seals 34, but no greater than and typically less than, that of the anode and cathode bipolar plates 30 and 32 in which it is seated. The materials for the key members 60 are typically a polymer, possibly natural but typically synthetic, and may include various plastics and fluroelastomers (FKM), and should have good water resistance if the key members are located inwardly of the interfacial seals 34. Of course a principal requirement of the material is that it possesses a hardness that is intermediate the hardness of the anode and cathode bipolar plates 30 and 32 and the hardness of the interracial seals 34. Since the hardness of the materials of both of those latter-mentioned materials not only differ relative to each other but may individually be selected from within a respective range, the hardness of the key member(s) 60 will also reside between the extremes of those ranges. The material(s) for key member 80 may be either electrically conductive or non-conductive.

Figure 2B:
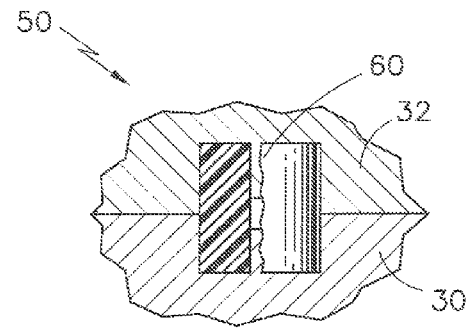

The key member 60 in the FIGS. 1, 2A and 2B embodiment is annular or cylindrical, and is annular in cross-sectional shape, and is disposed in engagement on a mounting stub 70 in one or the other of the key seat recesses 62 and 64 to facilitate alignment and assembly. As illustrated, both key seat recesses 62 and 64 are provided with mounting stubs 70. The key seat recesses 82 and 64 and the key member 60 are similarly shaped, e.g., here circular or modified annular in cross-sectional geometry, but alternatively rectilinear or some ether shape, with the key member 60 being slightly smaller in the transverse direction than the key seat recesses 62 and 64, e.g., radially, to accommodate some radial/transverse expansion of the key member upon longitudinal compression of the stack 12 during assembly. It will be appreciated that the key member 60 might alternately have been annular only on the ends to accommodate the mounting stubs 70, and solid in the mid-region for additional stability.

Referring to FIG. 2B, it is noted that the anode and cathode plates 30 and 32 have been assembled and compressed into contact with one another. The key-member 60 is sized slightly larger in the axial, or longitudinal, direction than the similar dimension of the combined key seat recesses 62 and 64 such that upon compression of the anode and cathode plates 30 and 32 into contact with one another, the key member 80 is similarly compressed and expands radially to fill and engage the side walls of the key seat recesses. In this way, shear loads imposed on the stack 12 as a whole are transmitted to and resisted by the key members 60 between the various pairs of fuel cells 14 which they span.

Typically, one or more key members 80 will be associated with each pair of adjacent fuel cells 14 in the stack 12, but fewer may be used if certain regions of higher shear loads are identifiable and the key members limited to those regions. Additionally, the key members 60 and their corresponding seat recesses 82 and 84 are located on/in the fuel cells 14 in positions causing minimum interruption to the flow of fluids. Several exemplary positions for the key members are depicted and will be described with respect to FIGS. 5A-5E. The key members 60 are relatively rigid and have a hardness designed to resist the shear loads and to generally avoid transmission of such loads to the interfacial seals 34 which are of a material of relatively less hardness. On the other hand, the material of key members 80 being of a hardness equal to or typically less than, that of the anode and cathode plates 30 and 32 assures that the key member 80 will not damage the plates in the event of significant shear loads.

Figure 3B:
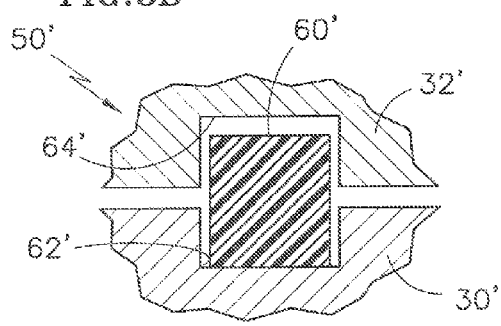
Figure 3B:
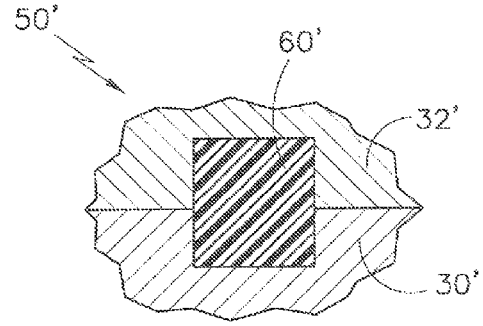

Another embodiment of a slip mitigation arrangement 50' is depicted in FIGS. 3A and 3B, wherein the key member 60' might be circular in shape, as are the associated seat recesses 62' and 64' in the anode plate 30' and the cathode plate 32', respectively. However, in this instance, the seat recesses 62' and 64' do not Include mounting stubs and the key member 60' is a solid disk or "biscuit". However, the "biscuit-type" key member 60' is the same in most other respects as the annular key member 80 of the preceding figures. As with respect to the embodiment depicted in FIGS. 2A and 2B, FIG. 3A depicts the key member 60' in seat recesses 62' and 64' prior to final assembly of the fuel cell stack, and FIG. 3B depicts the same elements following assembly.

Figure 4:
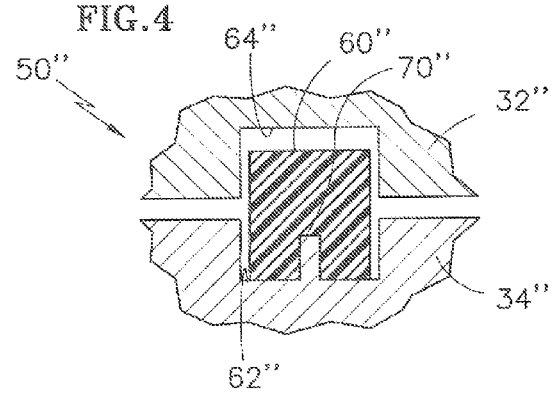
FIG. 4 is a partial sectional view similar to that of FIG. 2B, illustrating a further embodiment of a slip mitigation arrangement.

A further example embodiment of a slip mitigation arrangement 50" is depicted in FIG. 4, wherein seat recess 82" in the anode plate 30" includes a mounting stub 70", whereas the seat recess 64" in cathode plate 32" does not, since the function of mounting, i.e., positioning and stabilizing, the at least partly annular key member 60" can be accomplished with the single mounting stub 70"". Of course that mounting stub might have been located in the seat recess 84", rather than seat recess 62". Still further, the key member 60" is depicted as being solid, or disk-like, toward one end and annular at the other end to accommodate the mounting stub 70".

Reference is made now to FIGS. 5A-5E for simplified schematic depictions of several examples of numerous possible configurations for locating the slip mitigation arrangements 50 across the plan form of fuel cells 14 in a stack 12. FIG. 5A is a simplified plan form depiction of FIG. 1, and illustrates a single slip mitigation arrangement 50, shown as a broken line circle, generally located near the center of the plan form area of a fuel cell 14. FIG. 5B illustrates the inclusion of two slip mitigation arrangements 150 located near diagonally opposite corners of a fuel cell 114 in a stack 112. FIG. 5C illustrates the inclusion of four slip mitigation arrangements 250 located near the four corners of a fuel cell 214 in a stack 212. FIG. 5D illustrates the inclusion of five slip mitigation arrangements 350 for a fuel cell 314, with four being located near the four corners and one being near the center of the fuel cell 314 in a stack 312. FIG. 5E is similar to FIG. 5C in the sense that it depicts four slip mitigation arrangements 450 located near the four corners of a fuel cell 414 in a stack 412; however, it differs and departs from the depiction in FIG. 1 in that the interfacial seal 434, shown in broken line, is now located inward of both the outer perimeter of the fuel cell 414 and the locations of one or all of the slip mitigation arrangements 459.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. A fuel cell system comprising:
   a stacked plurality of adjacent fuel cells collectively forming a fuel cell stack, said fuel cells each including a pair of first and second plates at respective opposite ends thereof and an electrolyte therebetween, a first said fuel cell having a first said plate in engagement with a second said plate of a second fuel cell adjacent to said first fuel cell at respective engagement surfaces thereof and including an interfacial seal in mutual engagement with said first plate of said first fuel cell and said second plate of said second fuel cell; and
   a slip mitigation arrangement between at least one pair of said first and said second fuel cells comprising:
   a first seat recessed in said engagement surface of said first plate, a second seat recessed in said engagement surface of said second plate, and a key member having opposite ends seated in said first and said second recessed seats such that relative movement between said first and said second fuel cells is reduced, and the key member having an unexpanded cross-sectional geometry smaller than cross-sectional geometry of said first and said second seats and an uncompressed length greater than a combined depth of said first and said second seats; and wherein the first and second plates at opposite ends of a fuel cell are formed of a material having a first relative hardness, the key member is formed of a material having a second relative hardness equal to or less than said first relative hardness, and said interfacial seal is formed of a material having a third relative hardness less than both said first and said second relative hardnesses.

2. A fuel cell system comprising:

a stacked plurality of adjacent fuel cells collectively forming a fuel cell stack, said fuel cells each including a pair of first and second plates at respective opposite ends thereof and an electrolyte therebetween, a first said fuel cell having a first said plate in engagement with a second said plate of a second fuel cell adjacent to said first fuel cell at respective engagement surfaces thereof; and a slip mitigation arrangement between at least one pair of said first and said second fuel cells comprising:

a first seat recessed in said engagement surface of said first plate, a second seat recessed in said engagement surface of said second plate, and a key member having opposite ends seated in said first and said second recessed seats;

said first and said second seats respectively recessed in the engagement surfaces of said first and said second plates of said first and said second fuel cells having respective cross-sectional geometries, and the key member being longitudinally compressible and transversely expandable and having an unexpanded cross-sectional geometry smaller than the cross-sectional geometry of said first and said second seats and an uncompressed length greater than the combined depths of said first and said second seats, and wherein the key member is longitudinally compressed and expanded transversely into firm engagement with the sides of said first and said second seats when the fuel cell stack is fully assembled such that relative movement between said first and said second fuel cells is reduced.

3. A method for minimizing slip due to shear loading between adjacent fuel cells in a stack of plural fuel cells, said fuel cells each including a pair of first and second plates at respective opposite ends thereof and an electrolyte therebetween, a first said fuel cell having a first said plate for engagement with a second said plate of a second fuel cell adjacent to said first fuel cell at respective engagement surfaces thereof, the method comprising:

providing a first seat recessed in said engagement surface of said first plate;

providing a second seat recessed in said engagement surface of said second plate; said first and said second seats having respective cross-sectional geometries;

providing a key member disposed in one of said first and said second seats prior to stack assembly, said key member having a cross-sectional geometry similar to but smaller than the cross-sectional geometries of said first and said second seats and having a length greater than the combined depths of said first and said second seats; and assembling and longitudinally compressing said fuel cells in said stack to bring said fuel cells into engagement with one another and correspondingly longitudinally compress said key member and cause transverse expansion thereof into firm engagement with the sides of the first and second seats to thereby reduce any movement between said fuel cells.

\* \* \* \* \*